US005490385A

United States Patent [19]

Stoll et al.

[11] Patent Number: 5,490,385

[45] Date of Patent: Feb. 13, 1996

[54] VALVE RANGE

[75] Inventors: Kurt Stoll, Esslingen; Thomas Lederer, Kernen, both of Germany

[73] Assignee: Festo KG, Esslingen, Germany

[21] Appl. No.: 218,121

[22] Filed: Mar. 25, 1994

[30] Foreign Application Priority Data

Apr. 20, 1993 [DE] Germany .......................... 43 12 729.0

[51] Int. Cl.[6] ...................................................... F16D 31/02

[52] U.S. Cl. ............................. 60/368; 60/486; 137/844; 137/596.17

[58] Field of Search ........................ 91/530, 459; 60/368, 60/428, 486; 137/844, 596.17

[56] References Cited

U.S. PATENT DOCUMENTS

| | | | |
|---|---|---|---|
| 3,111,139 | 11/1963 | Beckett et al. | 137/884 |
| 3,503,414 | 3/1970 | Schnellmann | 137/884 |
| 3,959,883 | 6/1976 | Walls et al. | 91/459 |
| 4,230,143 | 10/1980 | Dettmann et al. | 137/884 |
| 5,025,834 | 6/1991 | Stoll | 137/884 |
| 5,234,033 | 8/1993 | Stoll et al. | |

FOREIGN PATENT DOCUMENTS

| | | | |
|---|---|---|---|
| 2631644 | 2/1977 | Germany . | |
| 3302253A1 | 7/1984 | Germany . | |
| 3834815A1 | 4/1990 | Germany . | |
| 3910913A1 | 10/1990 | Germany . | |
| 203780 | 8/1989 | Japan | 137/884 |
| 1059285 | 12/1983 | U.S.S.R. | 137/884 |

*Primary Examiner*—F. Daniel Lopez
*Attorney, Agent, or Firm*—Hoffmann & Baron

[57] ABSTRACT

A valve range is suggested suitable for use in connection with the control of fluid operated equipment. It possesses a fluid manifold, which is able to be fitted with pneumatic valves, which are operated via a signal manifold electrically. The valve range is so designed that it is suitable for the combined operation or control both of pneumatic valves and also of hydraulic valves. For the control of hydraulic valves it is provided with at least one control connection, from which the respective control signals may be taken. It is in this manner that, starting with a central valve range both pneumatic and also hydraulic valves may be operated and controlled in a comparatively simple fashion.

14 Claims, 2 Drawing Sheets

VALVE RANGE

BACKGROUND OF THE INVENTION

The invention relates to a valve range or station, that is to say valves in group, for use in connection with the control of fluid-operated devices, as for example fluid power cylinders, comprising a fluid manifold provided with internal fluid ducts and fitted with electrically operated pneumatic valves, which communicate with such fluid ducts and furthermore a signal manifold, from which the pneumatic valves may receive electrical signals for the operation thereof.

Valve ranges of this type, which are also termed valve ranges, have been described for example in the German patent publication 9,211,109 U. They are provided with a tabular liquid manifold or distributor, inside which fluid ducts extend, which communicate with the pneumatic valves arranged on it. A signal manifold designed for example as a control unit is in electrical connection with the valve drives of the pneumatic valves and supplies the necessary electrical actuating signals. It is in this manner that it is possible for the valves to be placed in circuit as required in order to operate fluid power devices in the desired fashion.

Such a valve range renders possible the operation of fluid power devices from a central point. This facilitates both installation and furthermore the later operation and monitoring of machines and plant which is equipped with fluid power devices. If in the case of such a fluid operated device there are not only pneumatically but also hydraulically driven ones then there has so far been a need to provide a completely separate control or operating system, since for hydraulic operation the relevant parameters are different to those applying for pneumatic systems The design complexity is then enormous more particularly as regards the electrical and electronic features then present in the control system for the various types of valve.

SHORT SUMMARY OF THE INVENTION

One object of the invention is to reduce the amount of design complexity in connection with the parallel operation of pneumatic and hydraulic valves.

In order to achieve these and/or other objects appearing from the present specification, claims and drawings, in the present invention the valve range is designed for combined operation both of pneumatic valves and also of hydraulic valves, it having available at least one control connection for connection with at least one electrically operable drive of a hydraulic valve.

It is then possible to operate and actuate both pneumatic valves and also hydraulic ones via a single valve range something which leads to an optimum linking of functions. There is the possibility of operating both types of valve via a single control unit, this being of particular advantage when the control unit is constituted by the signal manifold of the valve range and constitutes a direct component thereof. It has been recognized that in this manner pneumatic and hydraulic systems may be coupled together without interfering with one another, this being something which more particularly substantially simplifies the installation and operation of complex plant or machines.

Further advantageous forms of the invention are recited in the claims.

It would be feasible to equip the fluid manifold directly with hydraulic valves, in which case it would be convenient to provide mutually separate pneumatic and hydraulic duct systems As control connections it would be possible in this case to utilize connection devices in the form of plug-in devices which are laid in or on the fluid manifold and with which the drives of the hydraulic valves are able to be automatically coupled in the course of fitting the associated fluid manifold. In order to protect the valve range against fouling by leaking liquid one embodiment of the invention, which is presently considered to be advantageous, is such that the control connections for the hydraulic valve are to be designed as connections for at least one signal line, via which it would be possible to connect external hydraulic valves, i.e. hydraulic valves, which do not directly constitute a component of the valve range. Naturally it would be possible to arrange for a combination of the said designs.

In the case of operation of external hydraulic valves it is convenient to provide the associated control connections in at least one control part of the valve range, which may be integrated in the signal manifold, but is however preferably a separate component or, respectively, module, which constitutes a permanently connected or possibly detachable component of the valve range. In the event of there being a plurality of such drive parts it is possible for the valve range to be put together ad hoc and it would be possible to speak of a modular valve range.

In addition to the control connections for the hydraulic valves it is possible for the valve range to possess still further outputs and/or inputs for control signals, which are more especially also provided on at least one control part. They may have signal lines connected with them, which more particularly lead to monitoring devices such as sensors or the like.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
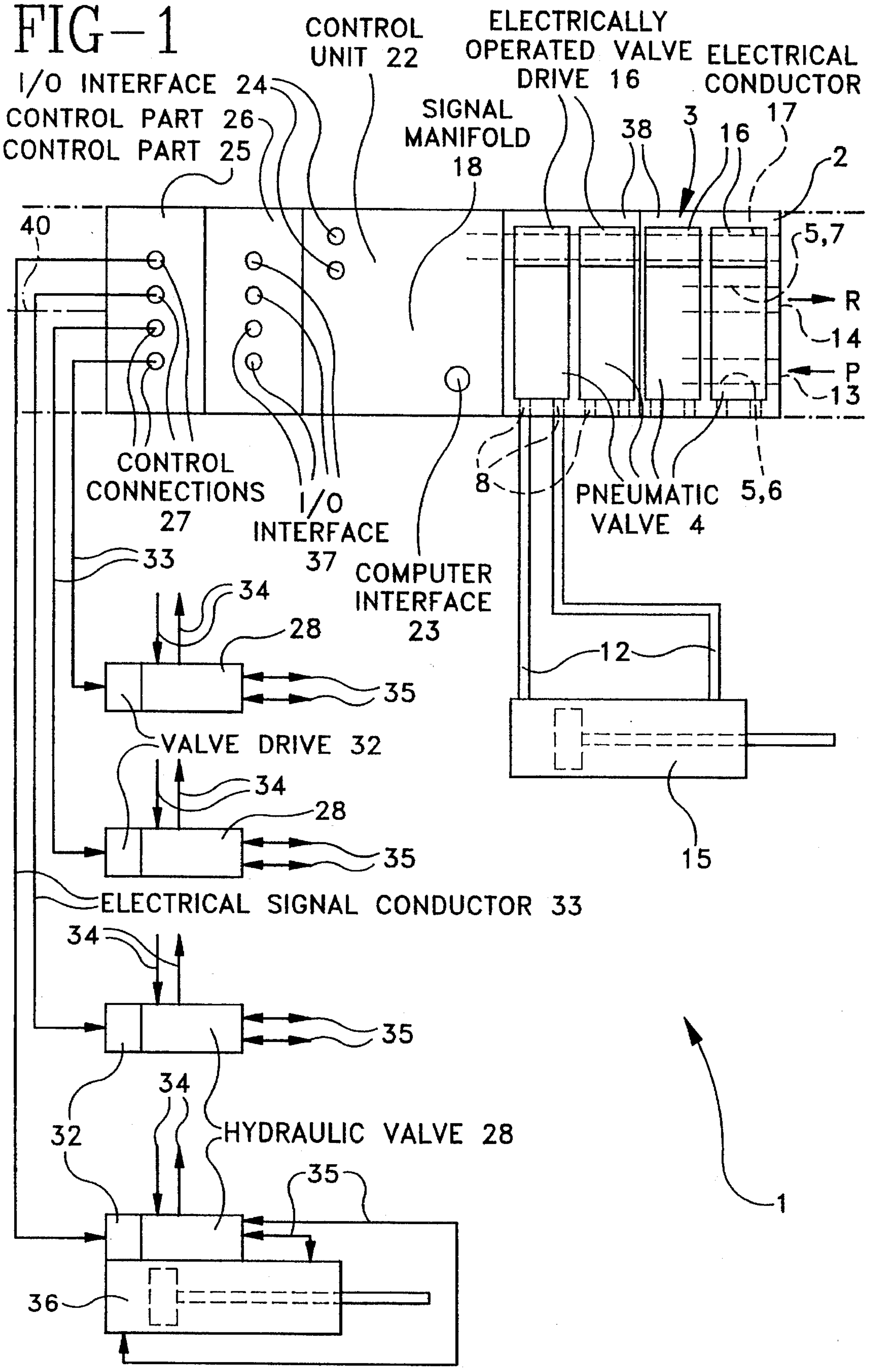
FIG. 1 shows a first design of the valve range in accordance with the invention as seen in a considerably simplified plan view, the valve range being only directly fitted with pneumatic valves, whereas the hydraulic valves are arranged externally and operated via suitable signal lines.

The valve range illustrated in FIG. 1 comprises a fluid manifold 2 for pneumatic pressure medium. On a mounting surface 3 of the fluid manifold 2 a plurality of pneumatic valves 4 are detachably secured, in the case of which it is a question of multiway valves. The valve ducts, which are not illustrated in detail, of the pneumatic valves 4 communicate with internal fluid ducts 5 (that is to say internal to the fluid manifold 2) which are only depicted in broken lines. One of these fluid ducts 5 is preferably a supply duct 6, which is able to be connected via a connection opening 13 or port with a source P of pressure medium and which at the other end opens adjacent to each valve 4 at the mounting surface 3. A fluid duct 5 serving as a spent air venting duct 7 has a form appropriate for this function and its central outlet opening 14 is able to be connected with a silencer or an air removal duct for leading away the spent air. Via the openings in the mounting surface 3 each pneumatic valve communicates both with the supply duct 6 and also with the spent air duct 7. Furthermore each pneumatic valve 4 communicates with at least one, and more especially two, load ducts 8 of the fluid manifold 2, which open at the outer surface of the fluid manifold 2 so that pressure medium lines 12 may be connected therewith, which lead to pneumatically operated devices 15. In the case of the working embodiment for the sake of simplicity only one such device 15 is illustrated diagrammatically.

In accordance with the position of switching of the individual pneumatic valves 4 it is possible for various pneumatically operated, connected devices to be supplied with compressed air or vented.

The operation of the pneumatic valves 4 is performed electrically. They each comprise an electrically operated valve drive 16, which as a rule will be a solenoid, such valves generally then being solenoid valves. Each valve drive 16 is in electrical connection with an electrical conductor arrangement 17, which extends along the fluid manifold 2, that is to say more especially inside the fluid manifold 2, in a suitable channel. For connection with the valve drives 16 electrical plug means are preferably provided so that the electrical connection is automatically produced when the respective valve is mounted.

The electrical conductor arrangement 17 originates at a signal manifold 18, which is arranged at the one terminal surface of the fluid manifold 2 and more particularly is permanently fixed in position. In the illustrated working embodiment the signal manifold 18 is constituted by a control unit 22, which holds a program and more particularly is able to be freely programmed so that independent or self contained operation is possible. An interface 23 makes possible the connection of a computer (PC) for programming arid setup purposes. Further interfaces 24 constitute the input and/or output of a field bus, via which further signal manifolds of other valve ranges can be connected up.

It would be feasible furthermore to provide a field bus communication unit without its own control program as a signal manifold, which unit would communicate with, and receive signals from, an external control unit, onf the basis of which the actuating signals would be distributed among the pneumatic valves 4. Instead of a field bus design it would be feasible as well to have conventional 1:1 wiring, more particularly one utilizing so-called multipole lines. If each valve drive 16 is to be associated with its own and more especially integrated field bus communication unit, then it is sufficient for the signal manifold to be a simple bus, which starts the valve drives.

The valve range in accordance with FIG. 1 furthermore comprises two control or operating parts 25 and 26 which are connected by electrical conductors (not illustrated) with the control unit 22 of the valve range, since they are for example connected with the signal manifold. The corresponding electrical conductors are not illustrated in the drawing, because they extend in the interior of the control parts 25 and 26. It is convenient if each control part 25 and 26 comprises a conductor section extending through in the direction of attachment, the conductor sections making up a continuous length of conductor in the assembled state.

On one of the control parts 25 a plurality of control connections are provided, which are accessible from the outside. They are designed so that they may be employed for the operation of hydraulic valves 28, which are provided with electrical valve drives 32. Each control connection 27 represents one control output, which is in electrical connection via one or more signal conductors 33 with the individual valve drives 32. The signal conductors 33 may be wires or cables, which may be simply and flexibly laid so that hydraulic valves 28 may be installed with their valve drives 32 at practically any distance from the valve range 1. The valve drives 32 receive the control signals via the signal conductors 33 and the control connections 27 as necessary for actuation, such control signals being produced by the control unit 22.

In order to ensure that the control signals, after leaving the valve range 1, do not have to be processed any more, it is to be recommended for each control connection 27 to be provided with an electrical and/or electronic outlet stage adapted to the valve drive to be operated, such stage so processing the incoming electrical actuating signals from the control unit 22 that they may be employed as direct actuating signals for the drives 32 of the hydraulic valves 28.

The respective output stages are integrated in the associated control part 25 and are consequently not visible in the figures.

The control connections of the control part 25 are preferably designed in the form of electrical plug connections or terminals so that the signal conductor 33 can be rapidly connected and disconnected.

The valve range 1 of the working embodiment 1 is designed for driving or actuating four hydraulic valves 28, for which reason the respective control part 25 is provided with four control signal outputs, or, respectively, control connections 27. It will be clear that a different number of control connections 27 could be provided, for example only a single one.

Each hydraulic valve 28 communicates with a system, denoted by arrows 34, of hydraulic lines, which produce the connection with a source of supply and a tank. In this respect a common line 34 for all hydraulic valves 28 would be possible. Moreover the hydraulic valves 28 are connected via load lines, which are indicated by further arrows 35, with the hydraulically driven loads or devices, only one such device 36 being depicted in a simplified way which may be in the form of a hydraulic cylinder. It will be clear this the hydraulic valves 28 may be directly attached to the device 36 or load to be operated.

The control part 25 constitutes one module of the valve range 1. By fitting it with further control parts it is possible for the valve range 1 to be expanded as may be desired in a modular fashion It is more particularly possible to provide further control parts 25, which possess control signal outputs for control connections 27 constituting hydraulic valves 28. Furthermore it is however also possible to provide at least one further control part 26, which is provided with outputs and/or inputs 37, via which the transmission of signals to and/or from other devices is possible, which are required for the operation of the valve range or are operated by the latter. More particularly such outputs and/or inputs render possible the connection of monitoring devices such as sensors or the like, by means of whose signals the control unit 22 performs the distribution of the electrical actuating signals In the case of the embodiment of the invention one control part 25 is provided exclusively for the control of the hydraulic valves 28, whereas one control part 26 is exclusively provided with inputs and/or outputs 37 for monitoring devices. It will however be clear that a single control part may certainly comprise a mixture of inputs and outputs or, respectively, control connections of different types.

It is in this manner that a valve range 1 is provided, which is suitable for the combined operation both of pneumatic valves 4 and also of hydraulic valves 28. For the operation of both types of valve it is sufficient to have a common control unit 22, which is of relatively low structural complexity as regards electronics. It is possible to match the operation of the pneumatic valves and of the hydraulic valve exactly to one another, a mutually independent actuation being feasible. Owing to the modular design of the valve range it is furthermore possible to operate it, when required, with only one of the two types of valve. It would be feasible to omit the control block 25 so that there would be an exclusively pneumatically operating valve range only fitted with pneumatic valves. Furthermore it would be feasible to omit the fluid manifold 2 with all pneumatic valves 4 and to utilize the remaining portion of the valve range exclusively for the control and actuation of hydraulic valves 28.

It is furthermore to be recommended to also design fluid manifold modularly as such, something which is the case with the working embodiment. The fluid manifold 2 is divided up into a plurality of length sections, which constitute manifold modules 38 connected together and of which each is fitted with at least one pneumatic valve 4. As is the case with the control parts 25 and 26 it is accordingly possible to achieve any desired expansion or further development of the pneumatic part.

Figure 2:
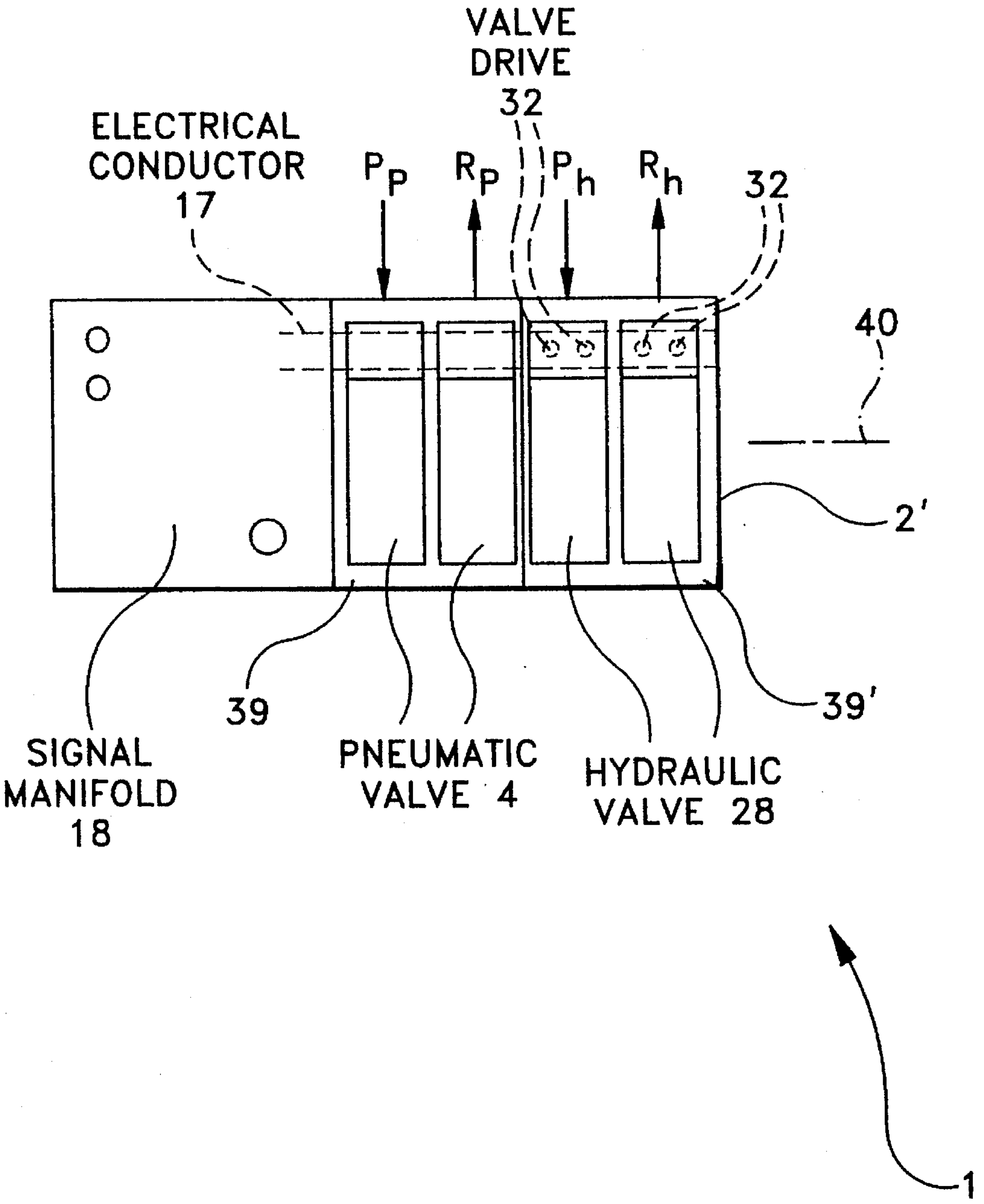
FIG. 2 shows a design of the valve range, in the case of which the fluid manifold is fitted both with pneumatic valves and also with hydraulic valves.

FIG. 2 diagrammatically indicates the possibility of mounting both the pneumatic valves 4 and also the hydraulic valves 28 on a single fluid manifold 2' of the valve range 1. In this case the electrical conductor arrangement 17 coming from the signal manifold 18 serves for the simultaneous supply of both types of valve with the necessary electrical actuating signals. The control connections 27 are provided in this case adjacent to the mounting sites or emplacements for the hydraulic valves 28 and are connected with the electrical conductor arrangement 17, the electrical drives 32 of the hydraulic valves 28 preferably being connected automatically with the control connections 27 in the course of fitting the valves. It is naturally possible to provide a separate electrical conductor arrangement (not illustrated) for the hydraulic valves 28, such arrangement however best extending in parallelism to that for the pneumatic valves 4.

The fluid manifold 2' comprises two mutually separate duct systems for the two types of valve, something which is indicated in figure by the arrows $P_p/R_p$ and $P_h/R_h$. Both duct systems may extend in accordance with the internal duct configuration in the fluid manifold 2 of the working embodiment in accordance with FIG. 1. It is however advantageous in this respect if the fluid manifold 2 has a separate manifold module 39 and 39' for each type of valve and which has its own duct system. In the illustrated working embodiment o,f the invention two such manifold modules 39 and 39' are provided, of which one (39) is fitted with a pneumatic duct system and the other (39') is fitted with a hydraulic duct system. A fluid power linkage between manifold modules 39 and 39' of different types is in this case not necessary, and it is preferred to keep to the electrical linkage in series. The manifold modules 39 and 39' may certainly be further subdivided as modules.

It will be clear that furthermore the valve range 1 in accordance with FIG. 2 may possess control parts 25 and 26, not illustrated in detail, via which a signal connection with external device is possible. The possibilities of design of a valve range indicated in the two working embodiments may be combined dust as may be desired.

It is convenient if both the control parts 25 and 26 and also the manifold modules 38; 39 and 39' are able to be arranged in a linear direction 40 of fitting together one after the other, the control parts 25 and 26 on the one hand and the manifold modules 38; 39 and 39' being arranged on opposite sides of the signal manifold 18, which itself has a block-like structure.

What is claimed is:

1. A valve range for use in connection with the control of fluid-operated devices, comprising:

a fluid manifold provided with internal fluid ducts, at least one of said ducts being a supply duct and at least another of said ducts being a spent air venting duct;

electrically operated pneumatic valves, said pneumatic valves communicating with said fluid ducts, said fluid manifold being fitted with said pneumatic valves;

valve drives for said electrically operated pneumatic valves;

a signal manifold, said signal manifold providing first electrical signals for the operation of said pneumatic valves;

an electrical conductor arrangement provided along said fluid manifold, said electrical conductor arrangement being connected to said valve drives for said pneumatic valves, said conductor arrangement being further connected to said signal manifold for transmission of said first electrical signals for the operation of said pneumatic valves;

an electrically operated hydraulic valve;

an electrically operable drive for said hydraulic valve;

a control connection for connection with said electrically operable drive of said hydraulic valve, said control connection being electrically connected to said signal manifold, said signal manifold providing at least a second electrical signal through said control connection for operation of said hydraulic valve;

a control unit associated with said signal manifold, said control unit containing a program that controls said first electrical signals and said second electrical signal for control of said pneumatic valves and said hydraulic valve, respectively.

2. The valve range as recited in claim 1, further comprising at least one signal conductor for said second electrical signal via which said electrically operable drive of said hydraulic valve is connected to said control connection, wherein said hydraulic valve is located remotely from said fluid manifold.

3. The valve range as recited in claim 2, wherein said control connection is an electrical plug connection means.

4. The valve range as recited in claim 2, further comprising a control part disposed adjacent said signal manifold, wherein said control connection is located on said control part.

5. The valve range as recited in claim 4, wherein the control part is designed in the form of a component which is separate from the signal manifold but is fixedly connected therewith.

6. The valve range as recited in claim 4, further comprising at least one additional control part, said control parts being arranged modularly in a direction of attachment and being detachably connected together.

7. The valve range as recited in claim 1, further comprising:

at least one control part disposed adjacent said signal manifold;

at least one of an output and an input for control signals located on said control part; and at least one monitoring device connected to said at least one of an output and an input.

8. The valve range as recited in claim 1, further comprising an output stage adapted to said electrically operable drive of said hydraulic valve, wherein said control connection is connected with said output stage.

9. The valve range as recited in claim 1, wherein the fluid manifold is adapted for simultaneous fitting with said pneumatic valves and said hydraulic valve.

10. The valve range as recited in claim 9, wherein the fluid manifold is formed with at least two mutually separate duct systems, one of said duct systems servicing said pneumatic valves and another of said duct systems servicing said hydraulic valve.

11. The valve range as recited in claim 9, wherein the fluid manifold is made up of at least first and second manifold modules, said first manifold module being designed for fitting with at least one of said pneumatic valves and being formed with a pneumatic duct system therein, said second manifold module being designed for fitting with said hydraulic valve and being formed with a hydraulic duct system therein.

12. The valve range as recited in claim 1, wherein:

said fluid manifold is formed with a mounting surface; and said pneumatic valves are detachably mounted to said mounting surface.

13. The valve range as recited in claim 1, wherein said control unit is integral with said signal manifold.

14. The valve range as recited in claim 1, wherein said control unit is programmable.

* * * * *